(12) United States Patent
Ando

(10) Patent No.: US 11,340,042 B2
(45) Date of Patent: May 24, 2022

(54) COMMAND CONTROL SYSTEM, INTERCEPTOR SYSTEM, AND COMMAND CONTROL METHOD

(71) Applicant: MITSUBISHI HEAVY INDUSTRIES, LTD., Tokyo (JP)

(72) Inventor: Keisuke Ando, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 557 days.

(21) Appl. No.: 16/258,777

(22) Filed: Jan. 28, 2019

(65) Prior Publication Data
US 2019/0249957 A1  Aug. 15, 2019

(30) Foreign Application Priority Data

Feb. 9, 2018 (JP) .............................. JP2018-022282

(51) Int. Cl.
*F41G 7/34* (2006.01)
*F42B 15/01* (2006.01)
*G01S 3/782* (2006.01)
*G01S 13/88* (2006.01)
*G05D 1/12* (2006.01)
*F41G 7/00* (2006.01)

(52) U.S. Cl.
CPC .............. *F41G 7/34* (2013.01); *F42B 15/01* (2013.01); *G01S 3/782* (2013.01); *G01S 13/88* (2013.01); *G05D 1/12* (2013.01); *G01S 13/883* (2013.01)

(58) Field of Classification Search
CPC ........ F41G 7/34; F41G 7/2286; F41G 7/2293; F41G 7/2233; F41G 7/007; F42B 15/01; G05D 1/12; G01S 3/782; G01S 13/88; G01S 13/883; G06F 8/20
See application file for complete search history.

(56) References Cited

U.S. PATENT DOCUMENTS 5,340,056 A * 8/1994 Guelman ................ F41G 7/007
244/3.16
5,458,041 A * 10/1995 Sun ......................... F41G 7/007
244/3.11

(Continued)

FOREIGN PATENT DOCUMENTS

JP    3-294796    12/1991
JP    8-285498    11/1996
JP    11-231049   8/1999

OTHER PUBLICATIONS

Notice of Reasons for Refusal dated Dec. 1, 2021 in counterpart JP application No. 2018-022282, with Machine Translation.

*Primary Examiner* — Bernarr E Gregory
(74) *Attorney, Agent, or Firm* — Wenderoth, Lind & Ponack, L.L.P.

(57) ABSTRACT

A command control system includes an interception predicting section and an assigning section. The interception predicting section calculates a predicted intercept point of a target to be shot down and a guided missile to shoot down the target. The assigning section acquires first weather data of the predicted intercept point, and generates a launching instruction based on the first weather data so as to launch one of a first guided missile and a second guided missile as the guided missile. A method by which the first guided missile detects the target and a method by which the second guided missile detects the target are different.

14 Claims, 11 Drawing Sheets

(56) References Cited

U.S. PATENT DOCUMENTS

| | | | |
|---|---|---|---|
| 7,207,517 B2* | 4/2007 | McKendree | F41G 7/007 244/3.15 |
| 2004/0243378 A1* | 12/2004 | Schnatterly | G06F 8/20 703/22 |
| 2005/0087649 A1 | 4/2005 | Sims et al. | |
| 2009/0127377 A1 | 5/2009 | Lam et al. | |

* cited by examiner

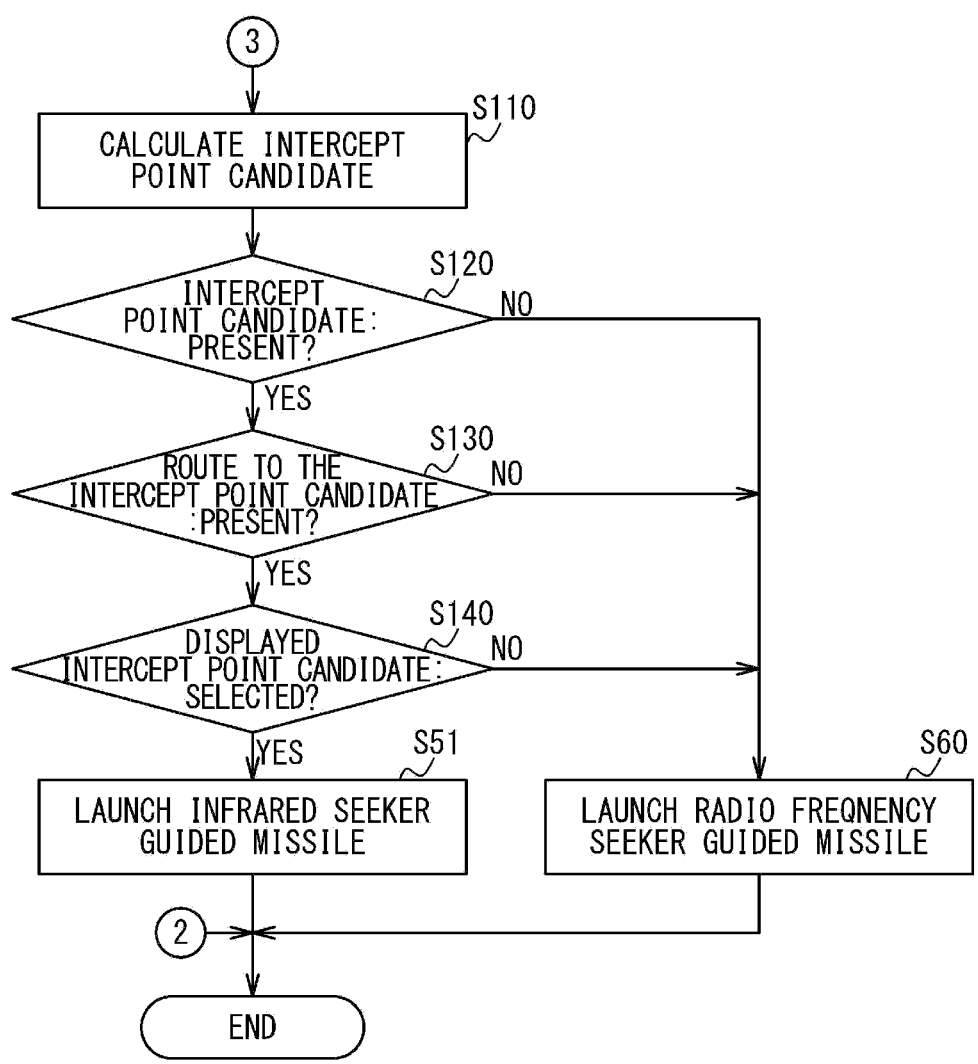

COMMAND CONTROL SYSTEM, INTERCEPTOR SYSTEM, AND COMMAND CONTROL METHOD

TECHNICAL FIELD

The present invention relates to a command control system, an interceptor system, and a command control method.

BACKGROUND ART

There is a method of detecting a target such as a flying object and guiding a missile for the target by using an infrared seeker.

Patent Literature 1 discloses a technique of guiding a flying object by comparing an image picked up by an infrared image pickup device and an image produced based on landform data and weather data.

Patent Literature 2 discloses a technique of determining whether a flying object can fly to a target point based on landform data, launching factors of the flying object and inputted weather data.

Patent Literature 3 discloses a technique of calculating a flying object route based on weather data. Also, Patent Literature 3 discloses a technique of the flying object flying above a rainfall region when the flying object detects the rainfall region.

CITATION LIST

[Patent Literature 1] JP H08-285498A
[Patent Literature 2] JP H03-294796A
[Patent Literature 3] JP H11-231049A

SUMMARY OF THE INVENTION

When an infrared seeker is used for guiding a flying object, the influence of weather to a guiding ability is large. Therefore, in an interceptor system corresponding to any weather, the flying object guided with a radio frequency seeker is used. However, the flying object using a radio frequency seeker requires high cost, compared with the flying object using an infrared seeker.

Taking the above-mentioned situation into account, the present invention has as one object, to provide an interceptor system corresponding to any weather and having low running cost.

The other objects could be understood from the following description of embodiments.

To achieve the above object, a command control system according to a first embodiment of the present invention includes an interception predicting section and an assigning section. The interception predicting section calculates a predicted intercept point of a target to be shot down and a guided missile to shoot down the target. The assigning section acquire first weather data of the predicted intercept point, generate a launching instruction based on the first weather data so as to launch one of a first guided missile and a second guided missile as the guided missile. A method by which the first guided missile detects the target and a method by which the second guided missile detects the target are different.

The above-mentioned first weather data may contain a first amount of rainfall. In this case, The assigning section may generate the launching instruction so as to launch the first guided missile, when the first amount of rainfall is less than a first threshold value determined previously. Also, the assigning section may generate the launching instruction so as to launch the second guided missile, when the first amount of rainfall is equal to or more than the first threshold value.

The above-mentioned first weather data may contain an altitude of a rainfall region. In this case, the assigning section may generate the launching instruction so as to launch the first guided missile when the predicted intercept point is higher than the rainfall region.

The above-mentioned command control system may further include a route predicting section more. The route predicting section calculates a first route of the first guided missile to the predicted intercept point. The assigning section acquires second weather data along the first route, and generates the launching instruction based on the first weather data and the second weather data.

The above-mentioned second weather data may contain a second amount of rainfall. In this case, the assigning section may generate the launching instruction so as to launch the first guided missile when the second amount of rainfall is less than a second threshold value determined previously. Also, the assigning section may generate the launching instruction so as to launch the second guided missile when the second amount of rainfall is equal to or more than the second threshold value.

The above-mentioned command control system may further include a route changing section configured to changing the route for the first guided missile to a second route when the second amount of rainfall is equal to or more than the second threshold value. In this case, the assigning section may acquire third weather data in the second route, and generates the launching instruction based on the first weather data and the third weather data.

The above-mentioned third weather data may contain a third amount of rainfall. In this case, the assigning section may generate the launching instruction so as to launch the first guided missile, when the third amount of rainfall is less than the second threshold value. Also, the assigning section may generate the launching instruction so as to launch the second guided missile when the third amount of rainfall is equal to or more than the second threshold value.

The above-mentioned assigning section may acquire fourth weather data in a neighborhood of the predicted intercept point, when generating the launching instruction so as to launch the second guided missile. In this case, the assigning section may determine an intercept point candidate of the target and the first guided missile based on the fourth weather data, and generate a selection instruction containing the intercept point candidate. Moreover, the assigning section may generate the launching instruction based on input data showing the intercept point candidate or the launching of the second guided missile.

The above-mentioned fourth weather data may contain a fourth amount of rainfall. In this case, the intercept point candidate may show a position where the fourth amount of rainfall is less than a third threshold value determined previously.

The above-mentioned first guided missile may be a guided missile which detects the target by an infrared seeker. Also, the second guided missile may be a guided missile which detects the target by a radio frequency seeker.

An interceptor system according to the second embodiment of the present invention the above-mentioned command control system, and a detection device which detects the target and a launcher in which a first guided missile and a second guided missile are loaded. The launcher launches the first guided missile or the second guided missile based on the launching instruction.

The above-mentioned the interceptor system may further include a weather observation device configured to observe the weather data of the predicted intercept point.

A command control method according to the third embodiment of the present invention includes a step of calculating a predicted intercept point of a target to be shot down and a guided missile to shoot down the target; a step of acquiring a first weather data of the predicted intercept point; and a step of generating a launching instruction so as to launch one of a first guided missile and a second guided missile as the guided missile based on first weather data. A method by which the first guided missile detects the target and a method by which the second guided missile detects the target are different.

A command control program according to a fourth embodiment of the present invention makes a computer execute: a step of calculating a predicted intercept point of a target to be shot down and a guided missile to shoot down the target; a step of acquiring a first weather data of the predicted intercept point; and a step of generating a launching instruction so as to launch one of a first guided missile and a second guided missile as the guided missile based on first weather data. A method by which the first guided missile detects the target and a method by which the second guided missile detects the target are different.

According to the present invention, the running cost of the interceptor system can be decreased by determining the guided missile used for the interception based on the weather data.

BRIEF DESCRIPTION OF THE DRAWINGS

FIG. 11C is a flow chart showing the processing of the interceptor system according to the embodiment 3.

DESCRIPTION OF EMBODIMENTS

Embodiment 1

Figure 1:
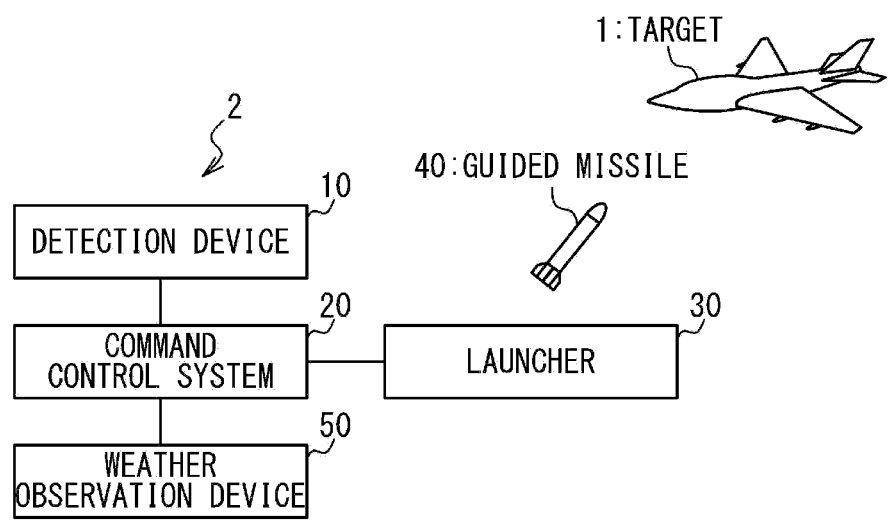
FIG. 1 is a schematic diagram showing an interceptor system according to an embodiment 1.

An interceptor system 2 according to an embodiment 1 contains a detection device 10, a command control system 20, a launcher 30, a guided missile 40 and a weather observation device 50, as shown in FIG. 1. The command control system 20 is connected with the detection device 10, the launcher 30 and the weather observation device 50. The detection device 10 detects a target 1 to be shot down. The weather observation device 50 observes weather in the neighborhood. The command control system 20 determines the guided missile 40 suitable to intercept the target 1 based on the detected target 1 and weather data observed by the weather observation device 50. The launcher 30 launches the determined guided missile 40 for the target 1. The guided missile 40 is an infrared seeker guided missile 41 or a radio frequency seeker guided missile 42.

Figure 2:
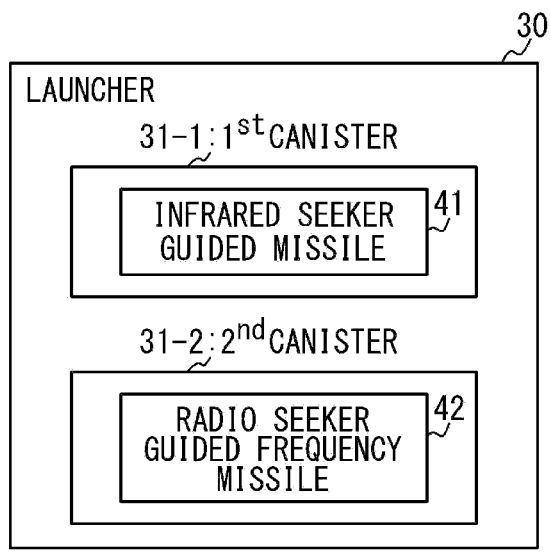
FIG. 2 is a configuration diagram of a launcher in FIG. 1.

As shown in FIG. 2, the launcher 30 has a plurality of canisters 31 which contain a first canister 31-1 and a second canister 31-2. The infrared seeker guided missile 41 is loaded in the first canister 31-1. The infrared seeker guided missile 41 has an infrared seeker (not shown) which detects the target 1 by using light wave such as infrared rays. The infrared seeker guided missile 41 flies for a predicted intercept point 200 with the target 1, when having been launched from the first canister 31-1. After the infrared seeker detects the target 1, the infrared seeker guided missile 41 flies for the target 1 based on the detection result.

The radio frequency seeker guided missile 42 is loaded in the second canister 31-2. The radio frequency seeker guided missile 42 has a radio frequency seeker (not shown) which detects the target 1 by using a radio frequency signal from, for example, a radar unit. The radio frequency seeker guided missile 42 flies for the predicted intercept point 200 with the target 1 when having been launched from the second canister 31-2. After the radio frequency seeker detects the target 1, the radio frequency seeker guided missile 42 flies for the target 1 based on the detection result.

Figure 3:
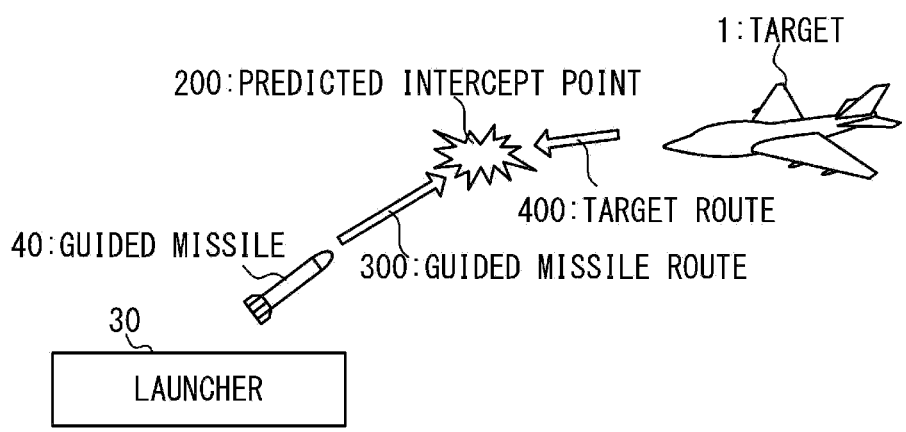
FIG. 3 is a diagram showing an operation of the interceptor system according to the embodiment 1.

As shown in FIG. 3, the guided missile 40 is launched from the launcher 30, and flies for the predicted intercept point 200 with the target 1 along a guided missile route 300. In this case, while the guided missile 40 is moving along the guided missile route 300, the target 1 is also moving along a target route 400. Therefore, the position where the guided missile 40 shoots down the target 1 is not a position where the target 1 has been detected but the predicted intercept point 200.

The infrared seeker guided missile 41 detects the target 1 by using the infrared rays. Therefore, in case of bad weather, like a case where it is raining in the predicted intercept point 200, the performance of the infrared seeker for the detection of target 1 declines. In this case, to shoot down the target 1 surely, the radio frequency seeker guided missile 42 should be launched. On the other hand, if the weather in the predicted intercept point 200 is fair, the target 1 could be detected even if the infrared seeker is used. Because the cost of the infrared seeker guided missile 41 is lower than that of the radio frequency seeker guided missile 42, the running cost of the interceptor system 2 can be suppressed by launching the infrared seeker guided missile 41. Therefore, the interceptor system 2 changes a kind of the guided missile 40 to be launched, based on the weather data of the predicted intercept point 200. For example, when the weather data of the predicted intercept point 200 shows to be fair, the interceptor system 2 launches the infrared seeker guided missile 41. When the weather data of the predicted intercept point 200 shows bad weather, the interceptor system 2 launches the radio frequency seeker guided missile 42.

Figure 4:
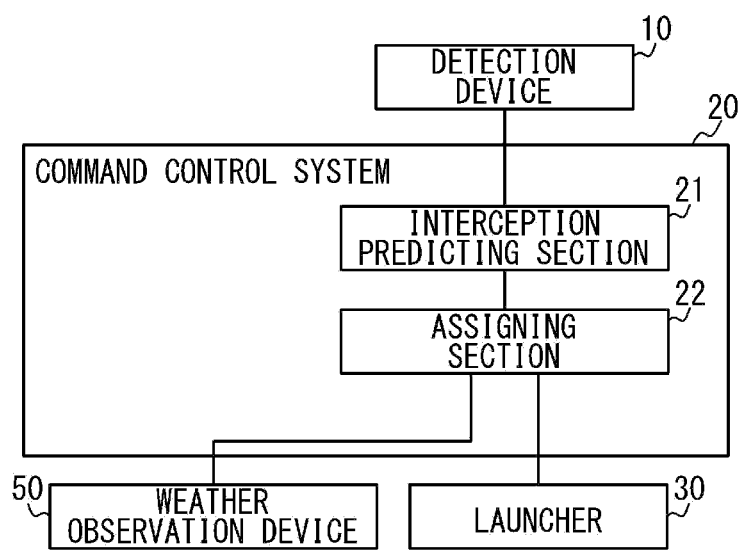
FIG. 4 is a diagram showing an example of functional configuration of the interceptor system according to the embodiment 1.

The functional configuration of the interceptor system 2 will be described. The detection device 10 detects the target 1 to be shot down. As shown in FIG. 4, the detection device 10 is connected with the command control system 20. The detection device 10 generates and transmits a target data signal showing data of the detected target 1 to the command control system 20. The position, speed, movement direction and kind of the target 1 are contained in the target data. For example, the detection device 10 contains a radar device that detects the target 1 by using radio frequency.

The weather observation device 50 observes the weather data around the interceptor system 2, e.g. in a firing range of the interceptor system 2. Also, the weather observation device 50 generates a weather data signal showing the observed weather data. An amount of rainfall, the height of cloud and so on are contained in the weather data.

The command control system 20 is connected with the detection device 10, the launcher 30 and the weather observation device 50. The command control system 20 receives the target data signal generated by the detection device 10. The command control system 20 calculates the target route 400 of the target 1 based on the received target data. The command control system 20 calculates the predicted intercept point 200 based on the target route 400 of the target 1 and the performance data of the guided missile 40 loaded in the launcher 30. Also, the command control system 20 acquires the weather data in the predicted intercept point 200 from the weather observation device 50. The command control system 20 determines the kind of guided missile 40 to be launched for the target 1 based on the acquired weather data. The command control system 20 generates a launching instruction signal so as to launch the guided missile 40, e.g. the infrared seeker guided missile 41 loaded in the first canister 31-1 based on the determined kind of guided missile 40. The command control system 20 transmits the generated launching instruction signal to the launcher 30.

The launcher 30 launches the guided missile 40 in response to the launching instruction generated by the command control system 20. Specifically, the guided missile 40 to be launched, the predicted intercept point 200, the guided missile route 300 and the kind of the target 1 are contained in the launching instruction. Therefore, the launcher 30 sets the guided missile route 300 for the guided missile 40 and launches it for the predicted intercept point 200. Also, the launcher 30 sets the kind of target 1 to be shot down to the guided missile 40.

The guided missile 40 flies along the set guided missile route 300. When the guided missile 40 approaches the predicted intercept point 200, the seeker, e.g. the infrared seeker installed in the guided missile 40 detects the target 1. The guided missile 40 flies for the target 1 detected by the seeker. As a result, the interceptor system 2 shoots down the target 1.

The functional configuration of the command control system 20 will be described. The command control system 20 includes an interception predicting section 21 and an assigning section 22.

The interception predicting section 21 receives the target data signal from the detection device 10 and calculates the predicted intercept point 200. Specifically, the position, speed, movement direction and kind of the target 1 are acquired from the received target data by the interception predicting section 21. The interception predicting section 21 calculates the target route 400 on which the target 1 moves, based on the acquired position, speed and movement direction. Also, the interception predicting section 21 maintains the performance data of the guided missile 40 loaded in the launcher 30 and the current position of the launcher 30. Therefore, the interception predicting section 21 calculates the predicted intercept point 200 when shooting down the target 1 with the guided missile 40, by using the target route 400, the current position of the launcher 30 and the performance data of the guided missile 40. The interception predicting section 21 outputs the calculated predicted intercept point 200 to the assigning section 22. Note that the current position of the launcher 30 has been registered by an operator after the launcher 30 is deployed.

The assigning section 22 determines the kind of guided missile 40 to be launched and generates the launching instruction. Specifically, the assigning section 22 acquires the predicted intercept point 200 from the interception predicting section 21. Also, the assigning section 22 receives the observation data signal from the weather observation device 50. The assigning section 22 extracts the weather data in the predicted intercept point 200 from the weather data contained in the observation data. The assigning section 22 determines the kind of guided missile based on the extracted weather data. For example, when the amount of rainfall in the predicted intercept point 200 is less than a threshold value determined previously, the assigning section 22 determines the infrared seeker guided missile 41 as the guided missile 40 to be launched. Also, when the amount of rainfall is equal to or more than the threshold value, the assigning section 22 determines the radio frequency seeker guided missile 42 as the guided missile 40 to be launched. The assigning section 22 generates and outputs the launching instruction signal to the launcher 30 to instruct the launching of the determined guided missile 40.

(Hardware Configuration of Command Control System)

Figure 5:
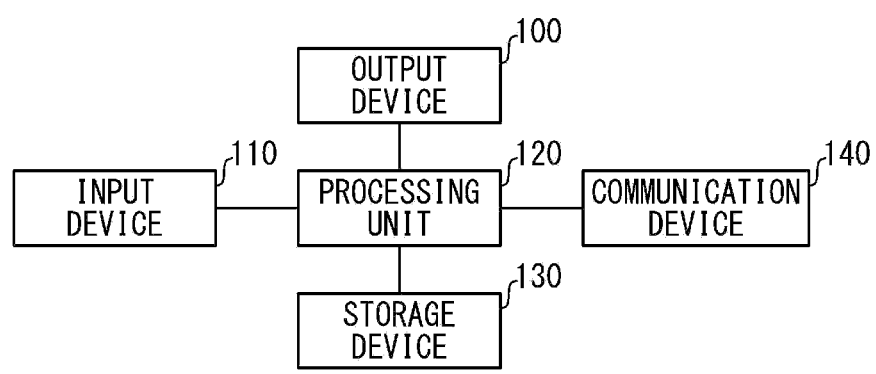
FIG. 5 is a diagram showing an example of hardware configuration of a command control system in FIG. 4.

As shown in FIG. 5, the command control system 20 includes an output device 100, an input device 110, a processing unit 120, a storage device 130 and a communication device 140. The output device 100 outputs the result of processing by the processing unit 120. For example, a display device, a speaker and so on are contained in the output device 100. The input device 110 is used to input data necessary for the processing by the processing unit 120. For example, a keyboard, a mouse, a microphone and so on are contained. The processing unit 120 realizes functions of the interception predicting section 21 and the assigning section 22. For example, a central processing unit (CPU), a dedicated circuit and so on are contained. The storage device 130 stores a command control program to execute the functions (of the interception predicting section 21 and the assigning section 22) by the processing unit 120, and stores temporary data for the processing by the processing unit 120, the performance data of the guided missile 40 and so on. For example, memory media such as a built-in hard disk drive of a computer, removable storage device, and USB memory are contained. The communication device 140 is used for the command control system 20 to transmit and receive data to and from external units. For example, the communication device 140 receives the target data signal from the detection device 10. Also, the communication device 140 transmits the launching instruction signal to the launcher 30. Moreover, the communication device 140 receives the observation data signal from the weather observation device 50. For example, the command control system 20 contains a computer, a server and so on.

(Operation of Interceptor System)

Figure 6:
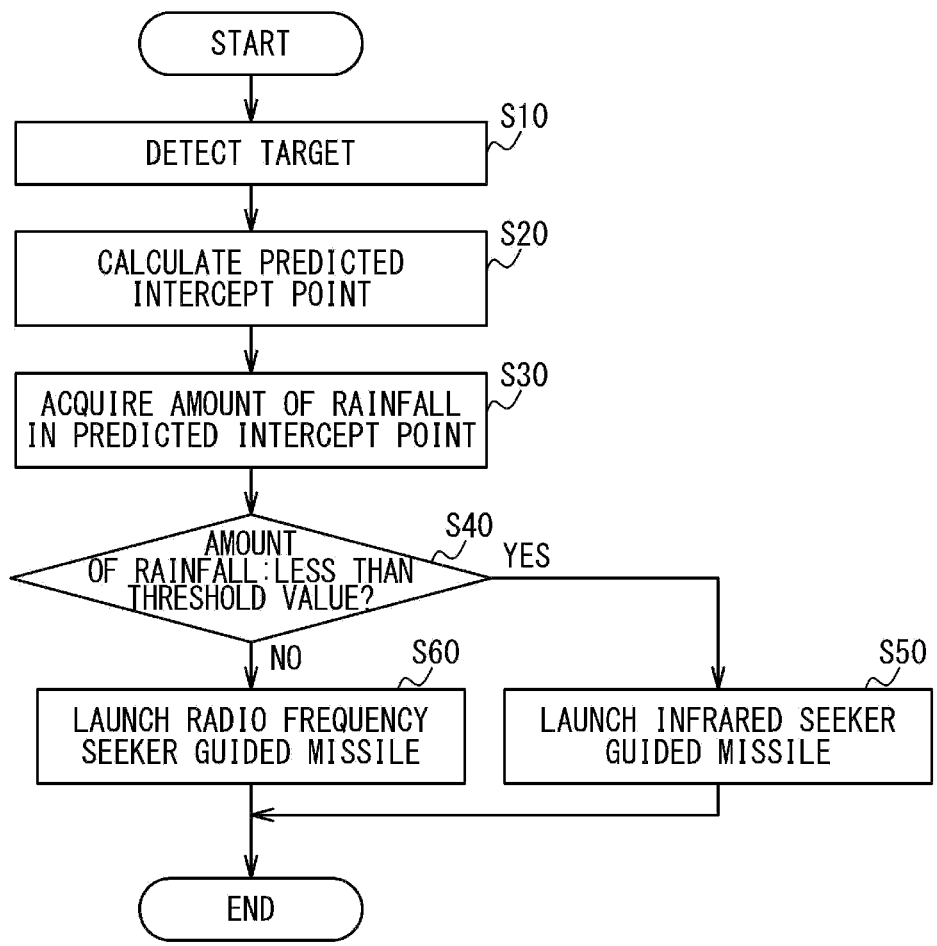
FIG. 6 is a flow chart showing the processing of the interceptor system according to the embodiment 1.

The operation of the interceptor system 2 will be described. The interceptor system 2 carries out the processing shown in FIG. 6. As shown in FIG. 6, the detection device 10 detects the target 1 to generate the detection data (Step S10). For example, the position, speed, movement direction, kind and so on of the target 1 are contained in the detection data.

At step S20, the interception predicting section 21 calculates the predicted intercept point 200 in response to the detection data signal. Specifically, the interception predicting section 21 extracts the position, speed and movement direction of the target 1 from the detection data. The interception predicting section 21 predicts the target route 400 of the target 1 based on the position, speed and movement direction of the target 1. For example, the interception predicting section 21 predicts the target 1 to move to the extracted movement direction in the extracted speed in a constant velocity linear motion. Moreover, the interception predicting section 21 has the performance data of the guided missile 40 loaded in the launcher 30 and the current position of the launcher 30. Therefore, the interception predicting section 21 calculates the predicted intercept point 200 based on the performance data of the guided missile 40, the current position of the launcher 30 and the target route 400. For example, the interception predicting section 21 calculates a firing area of the guided missile 40 based on the firing range of the guided missile 40 and the current position of the launcher 30. The interception predicting section 21 calculates the position where the target 1 moving along the target route 400 enters the firing area of the guided missile 40, as the predicted intercept point 200. The interception predicting section 21 outputs the calculated predicted intercept point 200 to the assigning section 22.

At step S30, the assigning section 22 acquires the observation data from the weather observation device 50. The assigning section 22 extracts the weather data in the predicted intercept point 200 from the acquired observation data. For example, the weather data contains the amount of rainfall.

At step S40, the assigning section 22 determines whether or not the extracted weather data satisfies a previously determined condition. For example, the assigning section 22 acquires the amount of rainfall in the predicted intercept point 200 and determines whether or not the amount of rainfall is less than a threshold value. Specifically, the assigning section 22 acquires the performance data of the infrared seeker guided missile 41. The assigning section 22 determines whether or not the infrared seeker guided missile 41 can detect the target 1 in the amount of rainfall in the predicted intercept point 200, based on the acquired performance data. When the amount of rainfall is less than the threshold value, the assigning section 22 determines to meet the condition and advances to step S50.

At the step S50, the assigning section 22 generates the launching instruction signal so as to launch the infrared seeker guided missile 41. The launcher 30 launches the infrared seeker guided missile 41 in response to the launching instruction. The predicted intercept point 200 is contained in the launching instruction. Therefore, the launcher 30 launches the infrared seeker guided missile 41 for the predicted intercept point 200. The infrared seeker guided missile 41 detects the target 1 in the predicted intercept point 200 and flies for the target 1.

At the step S40, when the amount of rainfall is equal to or more than the threshold value, that is, when the condition is not met, the control advances to step S60. At the step S60, the assigning section 22 generates the launching instruction so as to launch the radio frequency seeker guided missile 42. The launcher 30 launches the radio frequency seeker guided missile 42 in response to the launching instruction. The radio frequency seeker guided missile 42 detects the target 1 in the predicted intercept point 200 and flies for the target 1.

In this way, it is possible to suppress the used number of the radio frequency seeker guided missiles 42, by using the infrared seeker guided missile 41 based on the weather data in the predicted intercept point 200. In other words, since the guided missile 40 to be launched is change based on the weather data in the predicted intercept point 200, the running cost of the interceptor system 2 can be suppressed.

Embodiment 2

Figure 7:
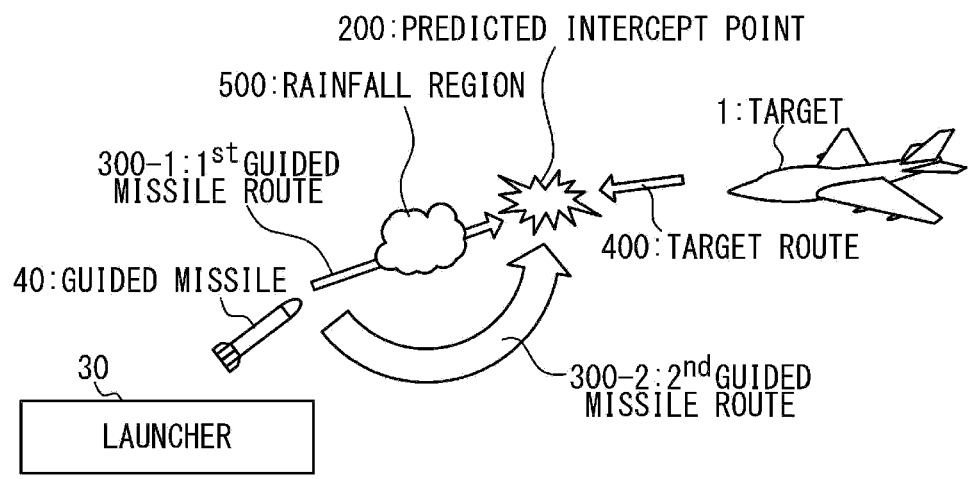
FIG. 7 is a diagram showing the operation of the interceptor system according to an embodiment 2.

In the embodiment 1, an example has been shown in which the kind of guided missile 40 is determined based on the weather data in the predicted intercept point 200. As shown in FIG. 7, even if the predicted intercept point 200 is fair, there is a case that a first guided missile route 300-1 passes through the rainfall region 500. In such a case, if the infrared seeker guided missile 41 is launched, there is a possibility that the infrared seeker breaks down in the rainfall region 500. Therefore, in an embodiment 2, an example is shown in which the interceptor system 2 searches a second guided missile route 300-2 bypassing the rainfall region 500. If the second guided missile route 300-2 can be searched, the infrared seeker guided missile 41 is launched to fly along the second guided missile route 300-2. In this way, the interceptor system 2 can change the kind of guided missile 40 to be launched, based on the weather data along the guided missile route 300.

The functional configuration of the interceptor system 2 will be described. The detection device 10, the launcher 30, the guided missile 40 and the weather observation device 50 have the same functions as in the embodiment 1.

Figure 8:
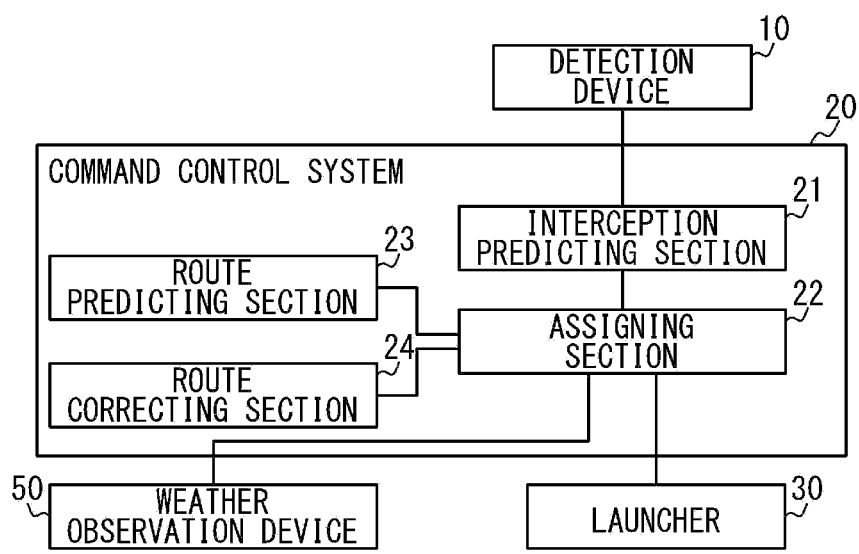
FIG. 8 is a diagram showing an example of functional configuration of the interceptor system according to the embodiment 2.

The functional configuration of the command control system 20 will be described. As shown in FIG. 8, the command control system 20 includes the interception predicting section 21, the assigning section 22, a route predicting section 23 and a route correcting section 24. The interception predicting section 21 has the same function as in the embodiment 1.

The route predicting section 23 calculates the first guided missile route 300-1 as a route through which the guided missile 40 reaches the predicted intercept point 200. Specifically, the route predicting section 23 acquires the predicted intercept point 200 from the assigning section 22. The route predicting section 23 holds the performance data of the guided missile 40. Therefore, by using the predicted intercept point 200 and the performance data of the guided missile 40, the route predicting section 23 calculates the guided missile route 300 through which the guided missile 40 reaches the predicted intercept point 200 after being launched. The route predicting section 23 outputs the calculated guided missile route 300 to the assigning section 22.

When there is the rainfall region 500 on the first guided missile route 300-1, the route correcting section 24 calculates a second guided missile route 300-2 which bypasses the rainfall region 500 and reaches the predicted intercept point 200. Specifically, the route correcting section 24 acquires the predicted intercept point 200 and the weather data in the neighborhood from the assigning section 22. The route correcting section 24 calculates the second guided missile route 300-2 to the predicted intercept point 200 from the current position of the launcher 30 based on the acquired weather data. For example, the route correcting section 24 extracts the rainfall region 500 where the amount of rainfall is equal to or more than the threshold value. The route correcting section 24 calculates the second guided missile route 300-2 which passes to the predicted intercept point 200 from the current position of the launcher 30 without passing the detected rainfall region 500. The route correcting section 24 outputs the calculated second guided missile route 300-2 to the assigning section 22.

The assigning section 22 determines the kind of guided missile 40 to be launched based on the weather data of the predicted intercept point 200 and the guided missile route 300 of the guided missile 40 and generates the launching instruction. Specifically, like the embodiment 1, the assigning section 22 determines the kind of guided missile 40 based on the weather data of the predicted intercept point 200. In this case, when the weather data of the predicted intercept point 200 does not meet the condition previously determined, the assigning section 22 selects the radio frequency seeker guided missile 42, like the embodiment 1.

When the weather data of the predicted intercept point 200 meets the condition, the assigning section 22 acquires the weather data along the guided missile route 300 of the guided missile 40. The assigning section 22 generates the launching instruction signal based on the weather data along the guided missile route 300. Specifically, the assigning section 22 outputs the acquired predicted intercept point 200 to the route predicting section 23 and acquires the first guided missile route 300-1 calculated by the route predicting section 23. Also, the assigning section 22 extracts the weather data along the first guided missile route 300-1 from the weather data contained in the observation data. Based on the extracted weather data, the assigning section 22 determines the kind of guided missile 40. For example, when the rainfall region 500 equal to or more than the threshold value is not contained in the extracted weather data, the assigning section 22 determines the infrared seeker guided missile 41 as the guided missile 40 to be launched. When the rainfall region 500 equal to or more than the threshold value is contained, the assigning section 22 outputs the predicted intercept point 200 to the route correcting section 24, which determines whether or not the rainfall region 500 can be bypassed. When the rainfall region 500 can be bypassed, the assigning section 22 determines the infrared seeker guided missile 41 as the guided missile 40 to be launched. When the rainfall region 500 cannot be bypassed, the assigning section 22 determines the radio frequency seeker guided missile 42 as the guided missile 40 to be launched. Then, the assigning section 22 generates and outputs the launching instruction signal to the launcher 30 to instruct to launch the determined guided missile 40.

(Hardware Configuration of Command Control System)

The command control system 20 includes the output device 100, the input device 110, the processing unit 120, the storage device 130 and the communication device 140, like the embodiment 1. The output device 100, the input device 110 and the communication device 140 are same as in the embodiment 1. The processing unit 120 executes the functions of the interception predicting section 21, the assigning section 22, the route predicting section 23 and the route correcting section 24. The storage device 130 stores the command control program to execute the functions (of the interception predicting section 21, the assigning section 22, the route predicting section 23 and the route correcting section 24) by the processing unit 120, and temporarily stores data for processing by the processing unit 120, the performance data of the guided missiles 40 and so on.

(Operation of Interceptor System)

Figure 9A:
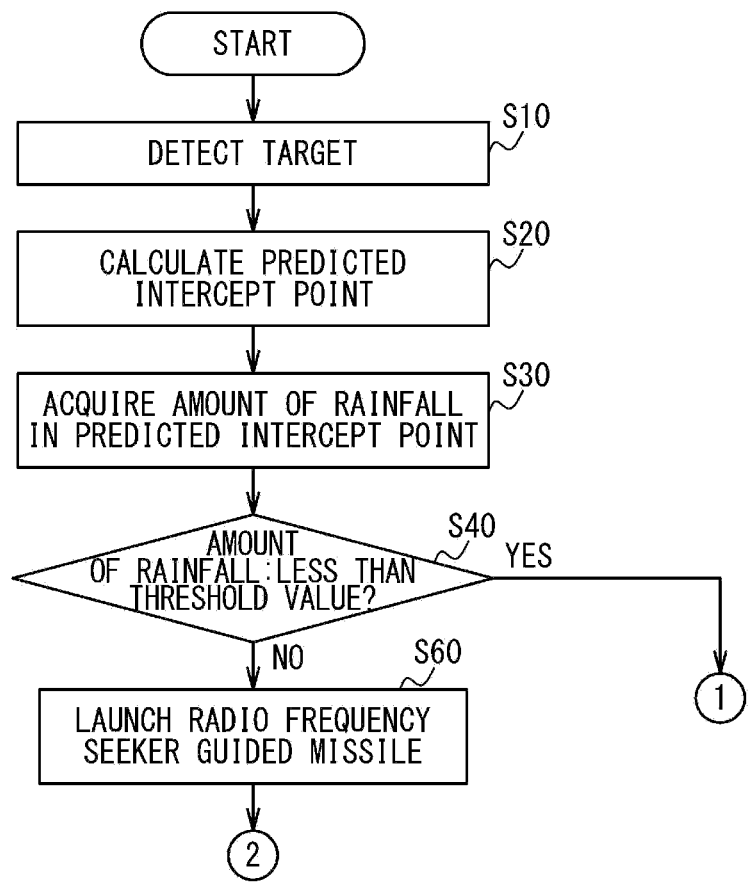
FIG. 9A is a flow chart showing the processing of the interceptor system according to the embodiment 2.
Figure 9B:
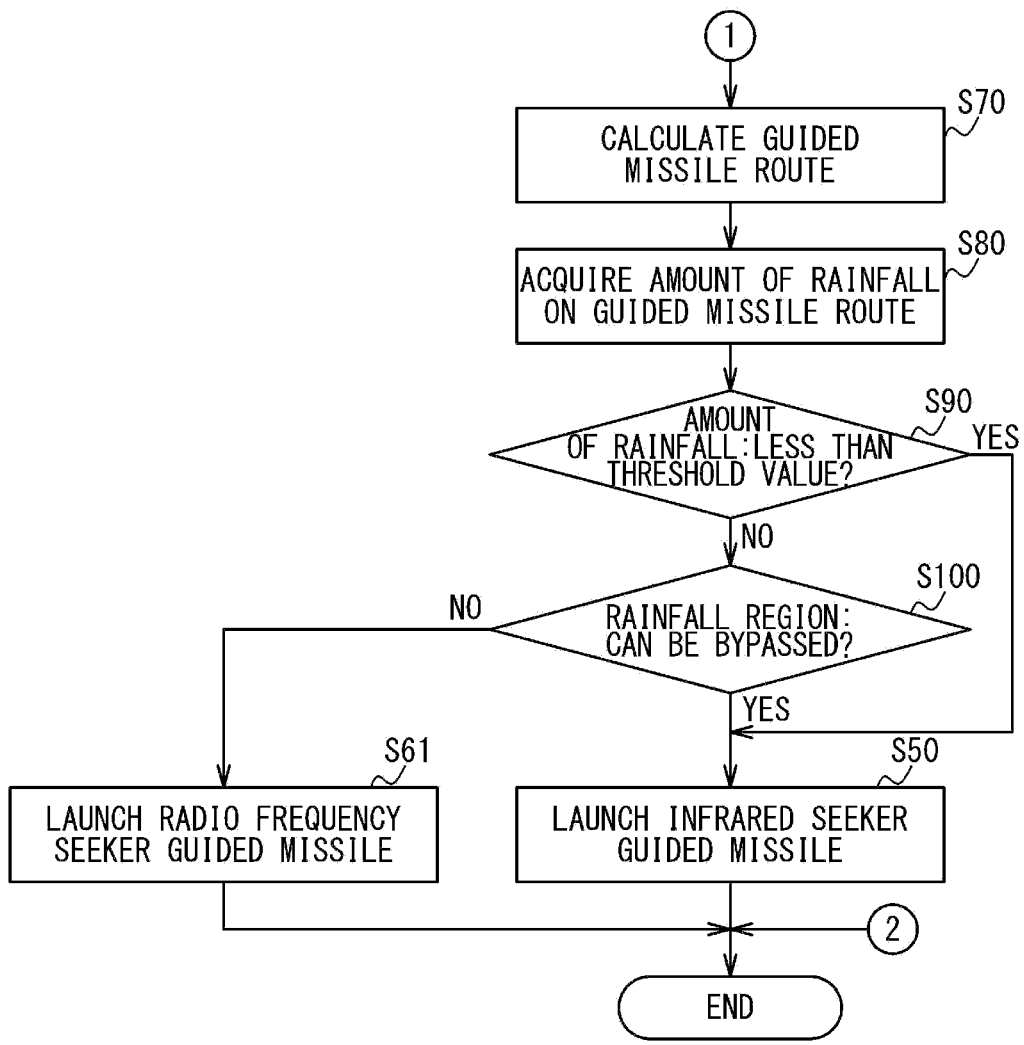
FIG. 9B is a flow chart showing the processing of the interceptor system according to the embodiment 2.

An operation of the interceptor system 2 will be described. The interceptor system 2 carries out the processing shown in FIGS. 9A and 9B. The step S10 to the step S40 and the step S60 are the same as in the embodiment 1.

At the step S40, when the assigning section 22 determines that the weather data of the predicted intercept point 200 meets the previously determined condition, the control advances to step S70. At the step S70, the route predicting section 23 calculates the first guided missile route 300-1 through which the guided missile 40 launched from the launcher 30 reach the predicted intercept point 200. Specifically, the assigning section 22 outputs the predicted intercept point 200 to the route predicting section 23. The route predicting section 23 acquires the performance data of the guided missile 40 loaded in the launcher 30. The route predicting section 23 calculates the first guided missile route 300-1 based on the performance data of the guided missile 40 and the predicted intercept point 200. For example, the route through which the guided missile 40 launched from the launcher 30 flies straightly to the predicted intercept point 200 is calculated as the first guided missile route 300-1. Also, a route determined previously based on the distance from the launcher 30 to the predicted intercept point 200 may be contained in the performance data of the guided missile 40. In this case, the route predicting section 23 may extract the previously determined route based on the distance from the launcher 30 to the predicted intercept point 200 and may calculate it as the first guided missile route 300-1. The route predicting section 23 outputs the calculated first guided missile route 300-1 to the assigning section 22.

At step S80, the assigning section 22 acquires the weather data along the first guided missile route 300-1. Specifically, the assigning section 22 acquires the weather data along the first guided missile route 300-1 from the observation data acquired from the weather observation device 50.

At step S90, the assigning section 22 determines whether or not the weather data meets the previously determined condition. For example, whether or not the first guided missile route 300-1 passes through the rainfall region 500 of the previously determined amount of rainfall is determined. In other words, whether or not the amount of rainfall shown in the acquired weather data is less than the threshold value previously determined is determined. When the amount of rainfall is less than the threshold value, i.e. when the condition is met, the control advances to step S50. In the case of the threshold value or above, the control advances to step S100. This threshold value is determined based on the performance data of the guided missile 40, and may be a value different from the threshold value at the step S40.

Also, when the infrared seeker guided missile 41 passes through the rainfall region 500, the transmissivity of a lens provided in the infrared seeker decreases. Therefore, when a decreasing rate of the transmissivity is less than a threshold value previously determined, the condition may be determined to be met at step S90. The transmissivity is calculated based on the speed of the guided missile 40 flying along the first guided missile route 300-1, the amount of rainfall along the first guided missile route 300-1, and the distance of the first guided missile route 300-1 contained in the rain region. Also, the threshold value is determined based on the performance data of the infrared seeker guided missile 41.

At step S100, the assigning section 22 determines whether or not the guided missile 40 can bypass the rainfall region 500. Specifically, the assigning section 22 outputs the weather data contained in the observation data and the predicted intercept point 200 to the route correcting section 24. The route correcting section 24 calculates a second guided missile route 300-2 to the predicted intercept point 200 from the current position of the launcher 30 based on the weather data, the predicted intercept point 200 and the performance data of the guided missile 40. The calculated second guided missile route 300-2 is outputted to the assigning section 22. When the second guided missile route 300-2 cannot be calculated, that is, when it is not possible to bypass, the route correcting section 24 outputs the effect to the assigning section 22. The assigning section 22 acquires the calculation result from the route correcting section 24. When it is possible to bypass, the control advances to the step S50, and when it is not possible to bypass, the control advances to step S61.

At step S50, the interceptor system 2 launches the infrared seeker guided missile 41. Specifically, the assigning section 22 generates and transmits the launching instruction signal to the launcher 30 so as to launch the infrared seeker guided missile 41. The launcher 30 launches the guided missile 40 in response to the launching instruction.

At the step S61, the interceptor system 2 launches the radio frequency seeker guided missile 42, which is the same processing as at the step S60.

In this way, the kind of guided missile 40 to be launched is changed by using the weather data of the guided missile route 300. By using the weather data along the guided missile route 300 in addition to the weather data in the predicted intercept point 200, the probability that the interceptor system 2 shoots down the target 1 is increased. Also, even if there is a region where the condition is not met in the guided missile route 300, the infrared seeker guided missile 41 can be used by setting a bypass route. Therefore, the running cost of the interceptor system 2 can be suppressed.

Embodiment 3

Figure 10:
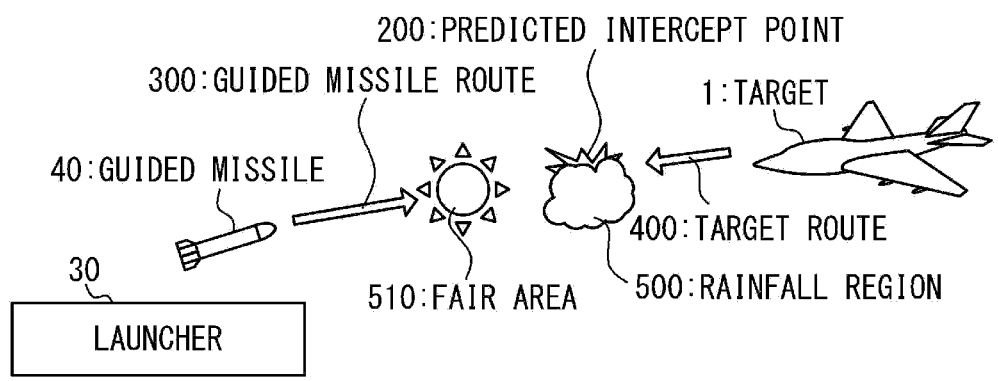
FIG. 10 is a diagram showing the operation of the interceptor system according to an embodiment 3.

As shown in FIG. 10, a case can be supposed where the predicted intercept point 200 is contained in the rainfall region 500 and there is a fair area 510 in the neighborhood of the predicted intercept point 200. In this case, the launching timing of the guided missile 40 may be adjusted so that the intercept point is changed into the fair area 510. In other words, by changing the intercept point, the infrared seeker guided missile 41 is launched so that the target 1 can be shot down. Thus, the interceptor system 2 searches whether or not the fair area 510 is present in the neighborhood of the predicted intercept point 200. When the fair area 510 is present, the intercept point is changes and the infrared seeker guided missile 41 is launched.

The functional configuration of the interceptor system 2 will be described. Each of the detection device 10, the launcher 30, the guided missile 40 and the weather observation device 50 has the same function as in the embodiment 2.

The functional configuration of the command control system 20 will be described. The command control system 20 has the interception predicting section 21, the assigning section 22, the route predicting section 23 and the route correcting section 24, like the embodiment 2. The interception predicting section 21 and the route predicting section 23 have the same functions as in the embodiment 2.

The route correcting section 24 has the same function as in the embodiment 2. Moreover, the route correcting section 24 acquires an intercept point candidate from the assigning section 22 and calculates a route from the current position of the launcher 30 to the intercept point candidate. This processing is the same as the processing of calculating the second guided missile route 300-2 to the predicted intercept point 200 from the current position of the launcher 30.

The assigning section 22 has the same function as in the embodiment 2. Moreover, the assigning section 22 determines whether it is possible to change the position where the guided missile 40 should shoot down the target 1, based on the weather data of the predicted intercept point 200 and the weather data in the neighborhood thereof. When the position to shoot down the target 1 can be changed, the assigning section 22 determines as the intercept point candidate, the position to shoot down the target 1 based on the weather data in the neighborhood of the predicted intercept point 200. The assigning section 22 outputs the determined intercept point candidate and the weather data to the route correcting section 24, and acquires the guided missile route 300 calculated by the route correcting section 24. The assigning section 22 generates and outputs the launching instruction signal to the launcher 30 so as to launch the infrared seeker guided missile 41 along the acquired guided missile route 300.

(Hardware Configuration of Command Control System)

The command control system 20 has the output device 100, the input device 110, the processing unit 120, the storage device 130 and the communication device 140, like the embodiment 2. The output device 100, the input device 110 and the communication device 140 are same as in the embodiment 2.

(Operation of Interceptor System)

Figure 11A:
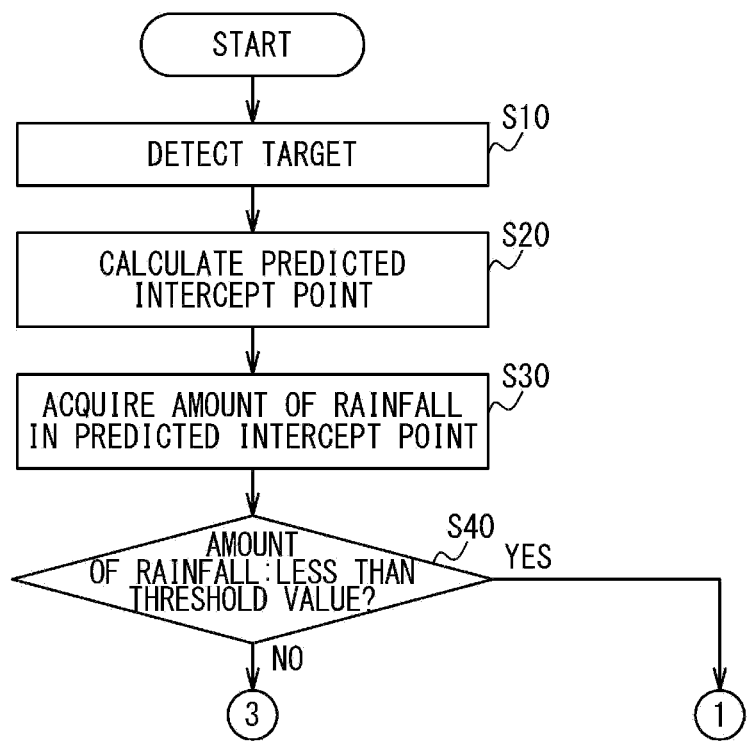
FIG. 11A is a flow chart showing the processing of the interceptor system according to the embodiment 3.
Figure 11B:
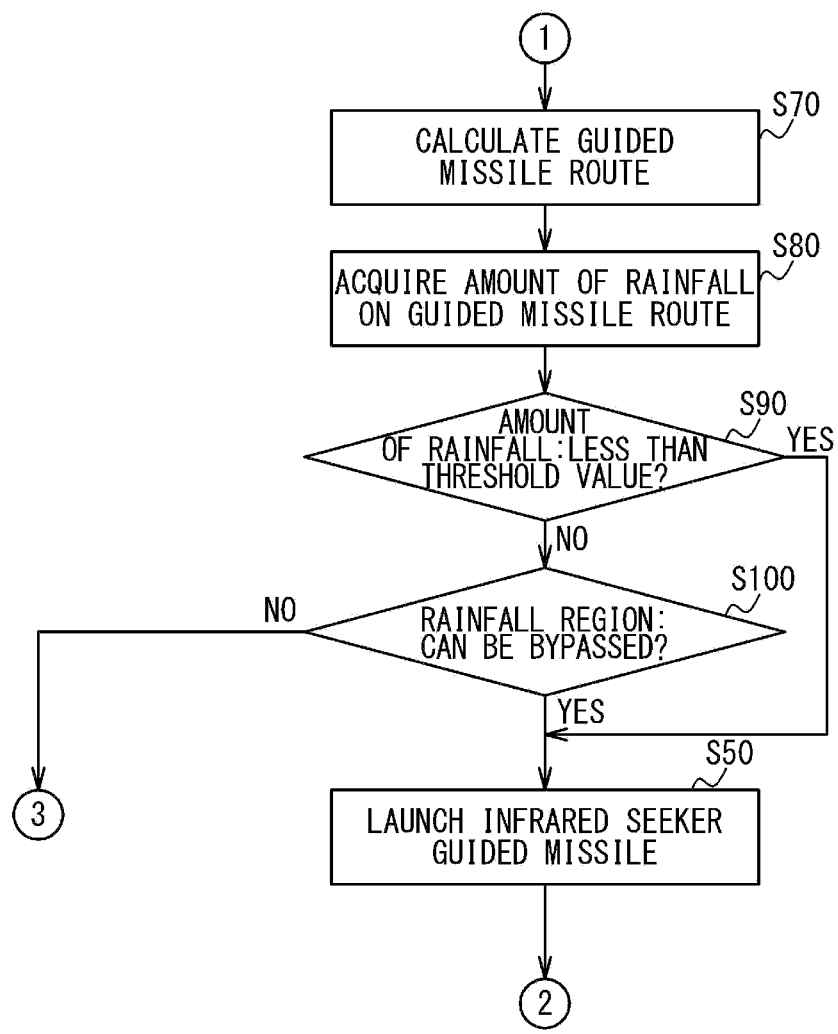
FIG. 11B is a flow chart showing the processing of the interceptor system according to the embodiment 3.

The operation of interceptor system 2 will be described. The interceptor system 2 carries out the processing shown in FIG. 11A to FIG. 11C. The step S10 to the step S40 and the step S70 to the step S100 are same as in the embodiment 2.

At the step S40, the control of the assigning section 22 advances to step S110 when the weather data of the predicted intercept point 200 does not meet the previously determined condition, e.g. when the amount of rainfall is equal to or more than the threshold value. Also, at the step S100, the control of the assigning section 22 advances to the step S110 when the rainfall region 500 cannot be bypassed. At the step S100, when the rainfall region 500 can be bypassed, the control advances to the step S50, so that the infrared seeker guided missile 41 is launched, like the embodiment 2.

At the step S110, the assigning section 22 calculates as the intercept point candidate, a position on the target route 400 where the weather data meets the previously determined condition, based on the weather data contained in the observation data. For example, the position is calculated where the amount of rainfall is less than the previously determined threshold value. Moreover, the intercept point candidate may be a position nearer the launcher 30 than the predicted intercept point 200. Note that this threshold value is determined based on the performance data of the guided missile 40, and may be the same as the threshold value at the step S40.

At step S120, the assigning section 22 determines whether or not the intercept point candidate exists. When the intercept point candidate does not exist, that is, when there is not a position where the weather data meets the previously determined condition, the control advances to the step S60, and the interceptor system 2 launches the radio frequency seeker guided missile 42. When the intercept point candidate exists, the control of the assigning section 22 advances to step S130.

At the step S130, the assigning section 22 determines whether or not the infrared seeker guided missile 41 can reach the intercept point candidate. Specifically, the assigning section 22 outputs the weather data contained in the observation data and the calculated intercept point candidate to the route correcting section 24. The route correcting section 24 calculates the guided missile route 300 to the intercept point candidate from the current position of the launcher 30 based on the weather data, the intercept point candidate and the performance data of the guided missile 40. The calculated guided missile route 300 is outputted to the assigning section 22. When the guided missile route 300 cannot be calculated, that is, when the infrared seeker guided missile 41 cannot reach the intercept point candidate, the effect is outputted to the assigning section 22. The assigning section 22 acquires the calculation result from the route correcting section 24. When there is the guided missile route 300, the control advances to step S140. When there is not the guided missile route 300, the control advances to the step S60. The interceptor system 2 launches the radio frequency seeker guided missile 42.

At step S140, the assigning section 22 notifies the intercept point candidate to an operator and determines whether or not the operator has selected the intercept point candidate. The interceptor system 2 advances to step S51 or step S60 based on the determination result, to launch the infrared seeker guided missile 41 or the radio frequency seeker guided missile 42. Specifically, the assigning section 22 generates and transmits selection data containing the intercept point candidate to the output device 100 of the command control system 20. The output device 100 displays the intercept point candidate. The operator selects the point to shoot down the target 1 from the displayed intercept point candidates, by using the input device 110. Or, when the target 1 should be shot down in the predicted intercept point 200, the operator selects the effect. The input device 110 generates input data according to the input of the operator. The launching of radio frequency seeker guided missile 42 and the selected intercept point candidate are contained in the input data. The assigning section 22 determines which of the intercept point candidate and the launching of radio frequency seeker guided missile 42 is contained in the input data. When the intercept point candidate is contained in the input data, that is, when the operator selects the intercept point candidate, the control advances to step S51 and the interceptor system 2 launches the infrared seeker guided missile 41. When the launching of radio frequency seeker guided missile 42 is contained in the input data, that is, when the operator selected that the target should be shot down in the predicted intercept point 200, the control advances to the step S60 and the interceptor system 2 launches the radio frequency seeker guided missile 42. Also, when the operator does not select in a previously determined time, the input device 110 may generate the input data which the intercept point candidate is not contained.

In this way, the interceptor system 2 changes the kind of guided missile 40 to be launched, based on the weather data of the predicted intercept point 200, the weather data along the guided missile route 300 and the weather data in the neighborhood of the predicted intercept point 200. In other words, the interceptor system 2 determines which of the infrared seeker guided missile 41 and the radio frequency seeker guided missile 42 should be launched, based on the weather data. Thus, the interceptor system 2 can shoot down the target 1 regardless of the weather.

Modification Example

In the above embodiments, an example has been described in which the amount of rainfall is exemplified as the weather data. However, the present invention is not limited to this. The weather data influencing the intercept probability of the guided missile 40 such as the position of cloud can be selected optionally. For example, the height of cloud, i.e. the altitude of rainfall region 500 may be contained in the weather data. When the predicted intercept point 200 is higher than the rainfall region 500 even if the amount of rainfall is above the threshold value, the infrared seeker guided missile 41 can be used. In this case, in the above embodiments, the condition of the amount of rainfall and the condition of the altitude of rainfall region 500 are employed. When intercept either condition, it may be determined that the weather condition is met. Specifically, even if the amount of rainfall is above the threshold value, it is determined that the condition is met, when the predicted intercept point 200 or the guided missile route 300 is higher than the rainfall region 500.

In the above embodiment, the infrared seeker guided missile 41 and the radio frequency seeker guided missile 42 are exemplified and the description has been given. However, the present invention is not limited to this. If the guided missile 40 influencing an interception rate by the weather is used, the kind of guided missile 40 can be selected optionally. Also, the conditions of the step S40, the step S90, the step S100, and the step S130 may be selected optionally, based on the performance data of the guided missile 40.

In the above embodiment, an example has been described in which two or more kinds of guided missiles 40 are loaded in the launcher 30. However, the present invention is not limited to this. For example, the interceptor system 2 may have the launcher 30 in which the infrared seeker guided missile 41 is loaded and the launcher 30 in which the radio frequency seeker guided missile 42 is loaded.

In the above embodiment, an example has been described in which the operator registers the current position of the launcher 30. However, the present invention is not limited to this. If the position of the launcher 30 can be acquired, an optional method may be selected. For example, the launcher 30 may have a GPS sensor and the command control system 20 may acquire the current position from the launcher 30.

In the above embodiment, an example has been described in which the second guided missile route 300-2 is calculated as the bypass route at the step S100. However, the present invention is not limited to this. For example, when the weather data along the first guided missile route 300-1 does not meet the previously determined condition at the step S90, the control may advance to the step S61 and the radio frequency seeker guided missile 42 may be launched. In this case, the command control system 20 includes the interception predicting section 21, the assigning section 22 and the route predicting section 23.

In the above embodiment 3, an example has been described in which the guided missile route 300 to the intercept point candidate is calculated at the step S130. However, the present invention is not limited to this. For example, when the intercept point candidate exists at the step S120, the control may advance to the step S140.

The processing explained above is only an example. The order and processing contents of steps may be changed in a range in which functions are not obstructed. Also, the described configurations may be changed optionally in the range in which functions are not obstructed.

What is claimed is:

1. A command control system comprising:
    a processing unit; and
    a communication device,
    wherein the processing unit is configured to:
        calculate a predicted intercept point of a target to be shot down and a guided missile to shoot down the target;
        acquire first weather data of the predicted intercept point;
        determine based on the first weather data whether a first guided missile or a second guided missile is launched as the guided missile; and
        generate a launching instruction signal so as to launch the determined guided missile,
    wherein the communication device is configured to output the launching instruction signal,
    wherein the first guided missile detects the target by a first seeker performing a first method, and
    wherein the second guided missile detects the target by a second seeker performing a second method different from the first method.

2. The command control system according to claim 1, wherein the first weather data includes a first amount of rainfall, and
    wherein the processing unit is configured to determine that the first guided missile is launched as the guided missile, when the first amount of rainfall is less than a first threshold value determined previously, and determine that the second guided missile is launched as the guided missile, when the first amount of rainfall is equal to or more than the first threshold value.

3. The command control system according to claim 1, wherein the first weather data includes an altitude of a rainfall region, and
    wherein the processing unit is configured to determine that first guided missile is launched as the guided missile when the predicted intercept point is higher than the rainfall region.

4. The command control system according to claim 1, wherein the processing unit is further configured to:
    calculate a first route of the first guided missile to the predicted intercept point;
    acquire second weather data along the first route; and
    determine based on the first weather data and the second weather data whether the first guided missile or the second guided missile is launched as the guided missile.

5. The command control system according to claim 4, wherein the second weather data includes a second amount of rainfall, and
    wherein the processing unit is configured to determine that the first guided missile is launched as the guided missile when the second amount of rainfall is less than a second threshold value determined previously, and determine that the second guided missile is launched as the guided missile when the second amount of rainfall is equal to or more than the second threshold value.

6. The command control system according to claim 5, wherein the processing unit is further configured to:
    change the route for the first guided missile to a second route when the second amount of rainfall is equal to or more than the second threshold value;
    acquire third weather data in the second route; and
    determine based on the first weather data and the third weather data whether a first guided missile or a second guided missile is launched as the guided missile.

7. The command control system according to claim 6, wherein the third weather data includes a third amount of rainfall, and
    wherein the processing unit is configured to determine that the first guided missile is launched as the guided missile, when the third amount of rainfall is less than the second threshold value, and determine that the second guided missile is launched as the guided missile when the third amount of rainfall is equal to or more than the second threshold value.

8. The command control system according to claim 1, wherein the processing unit is configured to:
    acquire fourth weather data in a neighborhood of the predicted intercept point, when generating the launching instruction so as to launch the second guided missile,
    determine an intercept point candidate of the target and the first guided missile based on the fourth weather data,
    generate a selection instruction including the intercept point candidate, and
    determine whether a first guided missile or a second guided missile is launched as the guided missile based on input data showing the intercept point candidate or the launching of the second guided missile.

9. The command control system according to claim 8, wherein the fourth weather data includes a fourth amount of rainfall, and
    wherein the intercept point candidate shows a position where the fourth amount of rainfall is less than a third threshold value determined previously.

10. The command control system according to claim 1, wherein the first guided missile is a guided missile which detects the target by an infrared seeker, and
    wherein the second guided missile is a guided missile which detects the target by a radio frequency seeker.

11. An interceptor system comprising:
    a command control system comprising a processing unit and a communication device;
    wherein the processing unit is configured to:
        calculate a predicted intercept point of a target to be shot down and a guided missile to shoot down the target;
        acquire first weather data of the predicted intercept point;
        determine based on the first weather data whether a first guided missile or a second guided missile is launched as the guided missile; and
        generate a launching instruction signal so as to launch the determined guided missile,
    wherein the communication device is configured to output the launch instruction signal,
    wherein the first guided missile detects the target by a first seeker performing a first method, and
    wherein the second guided missile detects the target by a second seeker performing a second method different from the first method;
    a detection device configured to detect the target; and
    a launcher in which the first guided missile and the second guided missile are loaded,
    wherein the launcher launches the first guided missile or the second guided missile based on the launching instruction signal.

12. The interceptor system according to claim 11, further comprising:
a weather observation device configured to observe the weather data of the predicted intercept point, the weather data including an amount of rainfall.

13. A command control method comprising:
calculating by a processing unit a predicted intercept point of a target to be shot down and a guided missile to shoot down the target;
acquiring by a processing unit a first weather data of the predicted intercept point;
determining by a processing unit based on the first weather data whether a first guided missile or a second guided missile is launched as the guided missile; and
generating a launching instruction signal so as to launch the determined guided missile,
wherein the first guided missile detects the target by a first seeker performing a first method, and
wherein the second guided missile detects the target by a second seeker performing a second method different from the first method.

14. A non-transitory storage medium which stores a command control program which is executed by a computer to realize the functions of:
calculating a predicted intercept point of a target to be shot down and a guided missile to shoot down the target;
acquiring a first weather data of the predicted intercept point; and
generating a launching instruction so as to launch one of a first guided missile and a second guided missile as the guided missile based on first weather data,
wherein the first guided missile detects the target by a first seeker performing a first method, and
wherein the second guided missile detects the target by a second seeker performing a second method different from the first method.

\* \* \* \* \*